(12) United States Patent
Eastep et al.

(10) Patent No.: US 9,811,143 B2
(45) Date of Patent: Nov. 7, 2017

(54) SYSTEMS AND METHODS FOR DYNAMIC SPATIAL POWER STEERING

(71) Applicant: Intel Corporation, Santa Clara, CA (US)

(72) Inventors: Jonathan M. Eastep, Portland, OR (US); Rohit Banerjee, Portland, OR (US); Richard J. Greco, West Linn, OR (US); Ilya Sharapov, San Jose, CA (US); David N. Lombard, Rossmoor, CA (US); Hari K. Nagpal, Southborough, MA (US)

(73) Assignee: INTEL CORPORATION, Santa Clara, CA (US)

( * ) Notice: Subject to any disclaimer, the term of this patent is extended or adjusted under 35 U.S.C. 154(b) by 226 days.

(21) Appl. No.: 14/581,885

(22) Filed: Dec. 23, 2014

(65) Prior Publication Data
US 2016/0179173 A1    Jun. 23, 2016

(51) Int. Cl.
*G06F 1/32* (2006.01)
(52) U.S. Cl.
CPC .......... *G06F 1/3234* (2013.01); *G06F 1/3206* (2013.01)
(58) Field of Classification Search
CPC ............................ G06F 1/3206; G06F 1/3234
See application file for complete search history.

(56) References Cited

U.S. PATENT DOCUMENTS

| 6,442,699 | B1* | 8/2002 | Nakajima | G06F 1/3228 713/320 |
| 2006/0218423 | A1 | 9/2006 | Diefenbaugh et al. | |
| 2006/0294400 | A1 | 12/2006 | Diefenbaugh et al. | |
| 2008/0301474 | A1* | 12/2008 | Bussa | G06F 1/3203 713/300 |
| 2012/0084028 | A1* | 4/2012 | Kumar | G06F 1/3206 702/61 |
| 2012/0185706 | A1 | 7/2012 | Sistla et al. | |
| 2012/0260117 | A1* | 10/2012 | Acar | G06F 1/3243 713/340 |
| 2013/0061064 | A1* | 3/2013 | Ananthakrishnan | G06F 1/26 713/300 |
| 2013/0111425 | A1* | 5/2013 | Kumar | G06F 17/505 716/104 |
| 2013/0318334 | A1 | 11/2013 | Waskiewicz, Jr. | |
| 2014/0082377 | A1 | 3/2014 | Dinh et al. | |
| 2014/0082380 | A1* | 3/2014 | Schluessler | G06F 1/26 713/300 |
| 2014/0136857 | A1* | 5/2014 | Jacobson | G06F 9/46 713/300 |

(Continued)

*Primary Examiner* — Thomas Lee
*Assistant Examiner* — Mohammad A Rahman
(74) *Attorney, Agent, or Firm* — Stoel Rives LLP

(57) ABSTRACT

Apparatus, systems, and methods provide dynamic spatial power steering among a plurality of power domains in the computer system on a per phase basis of a particular application. Dynamic spatial power steering may include, for example, determining a plurality of phases corresponding to an application comprising tasks for execution on a processing node. determining a spatial power distribution between a plurality of power domains on the processing node based on a performance metric for each phase, monitoring the application to detect a current phase, and applying the spatial power distribution correspond to the current phase to the plurality of power domains.

25 Claims, 5 Drawing Sheets

(56) References Cited

U.S. PATENT DOCUMENTS

| | | | |
|---|---|---|---|
| 2014/0181545 A1* | 6/2014 | Shrall | G06F 1/3206 713/320 |
| 2014/0189398 A1 | 7/2014 | Gorbatov et al. | |
| 2015/0177798 A1* | 6/2015 | Venishetti | G06F 1/189 713/300 |

* cited by examiner

SYSTEMS AND METHODS FOR DYNAMIC SPATIAL POWER STEERING

GOVERNMENT INTEREST

This invention was made with Government support under contract number H98230-11-3-0011 awarded by the Department of Defense. The Government has certain rights in this invention.

TECHNICAL FIELD

This disclosure generally relates to power management for servers and other computing devices.

BACKGROUND

Advances in semiconductor processing and logic design have permitted an increase in the amount of logic that may be present on integrated circuit devices. As a result, computer system configurations have evolved from multiple integrated circuits in a system to multiple hardware threads, multiple cores, multiple devices, and/or complete systems on an individual integrated circuit. As the density of integrated circuits has grown, the power requirements for computing systems (from embedded systems to high performance computing (HPC) systems) have also escalated.

Power and thermal management issues are considerations in designing computer-based systems. In HPC systems, for example, a specified thermal design power (TDP) and/or the cost of electricity may drive the need for low power systems. In other systems, including mobile systems, battery life and thermal limitations make these issues relevant. Optimizing a system for maximum performance at minimum power consumption is usually done using the operating system (OS) or system software to control hardware elements.

Some models for power and thermal control may monitor the running average power of a hardware device over a relatively large and dynamically adjustable window of time and maintain this average power at or below a given threshold. Such an approach may enable the device to consume above-limit power for short durations (as long as the running average power remains within the limit), but the device power supply and cooling solution put limits on the magnitude and length of the excursion.

BRIEF DESCRIPTION OF THE DRAWINGS

Arrangements and embodiments may be described in detail with reference to the following drawings, in which like reference numerals refer to like elements.

DETAILED DESCRIPTION OF EMBODIMENTS

Figure 1:
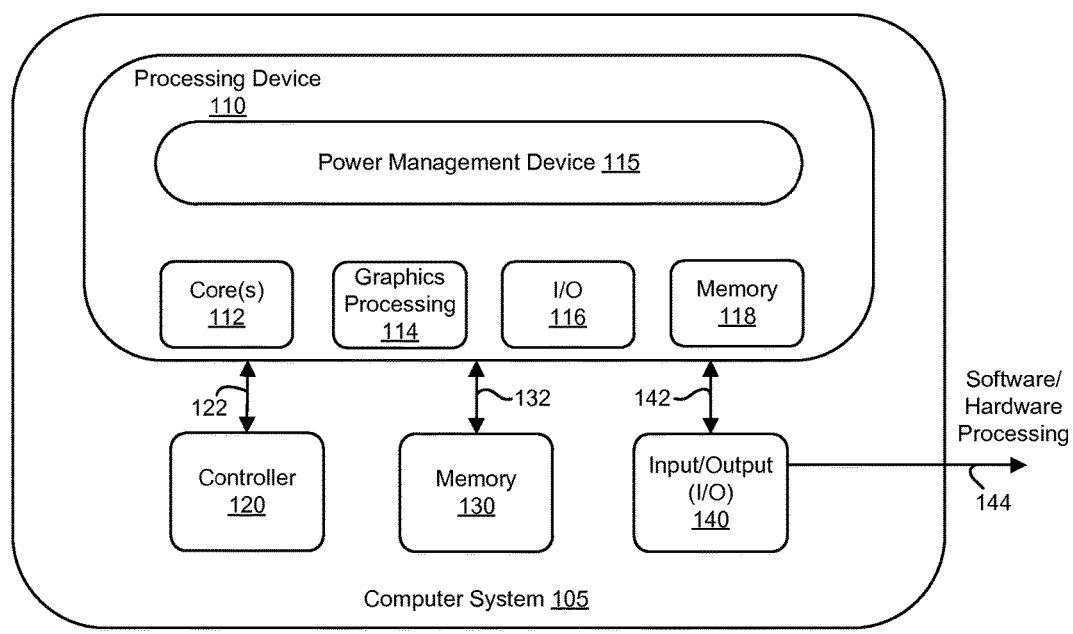
FIG. 1 illustrates an embodiment of an example computer system suitable for implementing various embodiments described herein.

Embodiments disclosed herein are generally directed to an apparatus, method, and other techniques for managing workloads on a computer system. A software application executed by a computer system may include a group of tasks that work together toward a common purpose (e.g., computing a solution to a problem). The tasks may execute on one or more nodes. Inside a node, there may be one or more tasks, and each task may include one or more processing threads. Certain embodiments provide dynamic spatial power steering among a plurality of power domains in the computer system on a per phase basis of a particular application.

The term power domain, or simply domain, is used herein to refer to any component or set of components capable of being monitored and controlled for power consumption. Certain embodiments automatically break the execution time of an application or system behavior into segments that exhibit a stable or predictable operational behavior. The stable or predictable segments are referred to herein as "phases" of an application. Each of the phases comprises, for example, a segment of the application that exhibits operational behavior different than that of the other phases. A phase may include, for example, a compute bound phase, a memory bound phase, a communication bound phase, a mixed compute/memory/communication phase, an idle phase, an active phase, and/or another phase bound to any operational behavior.

By dynamically monitoring and maintaining history, power is steered from domains having excess power or domains not critical to application performance to domains that may perform faster when given more power or to domains that are more critical to application performance. According to certain embodiments, individual phases are monitored and analyzed, and power steering decisions are tailored for the particular phase. Compared to other power management approaches, such embodiments may provide a demonstrable increase in application performance or improvements according to other power management objective functions such as system efficiency, e.g., energy-delay product (EDP) or energy-delay-square product (ED2P).

Rather than relearning an optimal or improved power assignment every time a different phase is entered, certain embodiments include a per phase history of power assignment. Thus, when an application phase change is identified, if the phase has occurred before in the application, the power assignment switches immediately to the last used (best known) allocation for the phase. As a result, more of the application run time occurs with an optimal or improved power allocation, which contributes to improved performance. Certain embodiments may also identify and take advantage of situations where performance of a domain can be purposely limited for the sake of assigning more power to another domain to improve overall application performance.

For purposes of discussion herein, certain examples may be described with regard to high performance computing (HPC) systems. However, the scope of the present disclosure is not limited to HPC examples, and embodiments are highly scalable to enable solutions for many different types of computer systems ranging from higher power computer systems such as any large cloud, big data, HPC, or other systems to low power computer systems such as laptop or Ultrabook™, tablet computers, smartphones, and other portable devices. Embodiments apply equally to systems having power requirements in between high power and low power systems such as desktop computers.

HPC clusters or supercomputers may run "power-constrained" such that a power cap is lower than the power that an application would require to reach a highest performance.

In the power-constrained scenario, using power as efficiently as possible increases performance. Because HPC software applications have multiple phases with different operational behavior (and thus with different activity in the domains), a static assignment of power to domains may not be optimal. For example, suppose that a computer comprises two domains, one being the processor and one being the main memory (e.g., dynamic random-access memory (DRAM), non-volatile memory, or other memory device). Suppose that the computer cannot exceed an average power of 100 W and that, through characterization of the application over all of its phases, the best static assignment is determined to be an average power limit of 50 W for the processor and an average power limit of 50 W for the main memory. 50 W is determined to be best in this example because average power cannot be reduced below 50 W in the memory bound phases without severely increasing application runtime. Yet, during compute bound and communication bound application phases, there is not enough memory activity to utilize the full 50 W reserved for the main memory domain. Thus, the static assignment results in stranded power (power reserved for domains above the current domain needs) and sub-optimal performance.

Dynamic spatial power steering is a method for improving the performance of a node under power capping by tailoring power allocation and management decisions to individual phases of the application. Different phases of an application may have different activity in resources or domains (e.g. cores, uncore, memory, etc.) in the node (e.g., server). Other solutions either statically assign power to domains based on a characteristic like average power over the whole application run, or monitor and dynamically allocate power but do it based on application characteristics over a history of behavior in the last k time windows. If power is assigned statically to domains, there may be times when a particular domain uses all of its power allocation, times when the domain could perform faster if given more power, and times when the domain will not use the full power budget (i.e., power is stranded). Solutions that assign power dynamically based on a history of behavior in time windows can improve stranding of power for applications with a steady-state behavior throughout (single phase), but may provide little or no improvement for applications that have multiple phases with different characteristics. Such solutions monitor behavior at time windows (fixed or variable) that blend together the behavior of any phases executing (partially or completely) during the intervals. Such solutions assume that blended behavior in past windows will be a good predictor of future behavior, but each time window may contain disparate application phases with different operational behavior and different optimal power allocations.

In certain embodiments, various power domains are monitored and controlled based on a running average power limit (RAPL). A power manager may specify the RAPL for each of the available power domains, and enforce the RAPL power limit by modulating low level performance parameters such as power controls and/or discrete processor performance states (P-states). In certain such embodiments, dynamic spatial power steering includes learning an optimal allocation of power among the various RAPL power domains for each of the application phases. HPC applications and other applications may demonstrate repetitive behavior where the same phases occur over and over again. Certain embodiments exploit this operational behavior. Once the optimal or improved power allocation has been learned or determined for a particular phase, it can be re-used (e.g., immediately) when the application enters that same phase in the future.

Certain embodiments enable the use of dynamic policies that maintain power allocations for each phase, which reduces or completely removes stranded power by assigning power to domains where it will be used to increase performance. Certain such embodiments provide, for example, about 10% to 20% performance increases within the same power budget compared to a static power assignment. Similar performance increases may be provided over power managers that dynamically allocate power based on a history of behavior over the last k time windows.

Various embodiments also relate to an apparatus or system for performing the operations disclosed herein. The apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the disclosed methods. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an example computer system 105 suitable for implementing various embodiments described herein. In various embodiments, the computer system 105 comprises a processing device 110, a controller 120, a memory device 130, and an input/output (I/O) device 140. The processing device 110 may be any type of computational element, such as but not limited to, a server (e.g., in a bay in a rack of servers), a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing device 110 may be connected to and communicate with the controller 120, the memory device 130, and the I/O device 140 via interconnects 122, 132 and 142, respectively. Moreover, the controller 120, the memory device 130, and the I/O device 140 may communicate with all of the components of the processing device 110.

While not limited in this respect, the processing device 110 may comprise a power management device 115, one or more processing cores 112, a graphics processing unit 114, an I/O device 116, a memory device 118, and any other uncore (non-core) components (not shown). Uncore components may include other memory, caches, I/O devices and controllers. In some embodiments, the processing device 110 may include more than two processing cores, for example. The one or more processing cores 112 may have more than one processing unit. The one or more processing cores 112 include, but are not limited to, pre-fetch logic to fetch instructions, decode logic to decode the instructions, execution logic to execute instructions, and other logic.

In certain embodiments, the processing device 110 comprises a graphics processing unit 114. The graphics processing unit 114 may function as an adjunct processor that manages graphics and/or video operations and/or processing.

The processing device 110 comprises an I/O device 116 and a memory device 118 in some embodiments. The I/O device 116 provides an external interface for the processing device 110 to other devices within the computer system 105. In addition, the memory device 118 stores instructions and/or data of the processing device 110, and in particular, the one or more processing cores 112. The memory device 118 may also store temporary variables or other intermediate information while the processing device 110 and the one or more processing cores 112 are executing instructions. In another embodiment, the memory device 118 includes, but is not limited to, level one (L1), level two (L2) and level three (L3) cache memory or any other configuration of the cache memory within the processing device 110. The processing cores 112, the graphics processing unit 114, the I/O device 116, and the memory device 118 may communicate with each other via interconnects (not shown).

The controller 120 may include a microcontroller or other type of processing circuitry, memory and interface logic. In some embodiments, the controller 120 may monitor and control operation of the computer system 105 including, but not limited, monitoring and controlling operation of the memory device 130 and the I/O device 140. The controller 120 may also monitor and control various aspects of the processing device 110, including but not limited to, communication between various components of the computer system 105 and the processing device 110. In various embodiments, the controller may be coupled with the processing device 110 via interconnect 122.

The memory device 130 stores instructions and/or data of the computer system 105. The memory device 130 may also store temporary variables or other intermediate information while the computer system 105 is executing instructions. The I/O device 140 is the interface between the computer system 105 and an external system or device. The I/O device 140 may communicate with the external system or device via a connection 144. Connection 144 may be wired or wireless or any other means known to one skilled in the art. In one embodiment, the I/O device 140 may communicate with the processing device 110 via interconnect 142 through the I/O device 116. The power management device 115, the memory device 130 and the I/O device 140 may also communicate with each other via interconnects (not shown).

The components illustrated in the computer system 105 are not meant to be limiting and are presented for purposes of illustration. In other embodiments, the configuration of the computer system 105 includes other (more or less) components than shown in FIG. 1. One of ordinary skill in the relevant art will appreciate that other configurations of the computer system 105 can be used without affecting the workings of the embodiments described herein.

In certain embodiments, the power management device 115 is configured to provide dynamic spatial power steering among a plurality of power domains in the processing device 110 on a per phase basis of a particular application. The power domains may include, for example, a core domain comprising the one or more processing cores 112, and an uncore domain comprising the graphics processing unit 114, the I/O device 116, the memory device 118, and any other uncore components (not shown). In addition, or in other embodiments, the one or more processing cores 112 may comprise a plurality of power domains, each corresponding to a respective processing core or group of cores of any size (not necessarily uniformly sized). Further, any of the elements shown in FIG. 1 (i.e., the controller 120, the memory device 130, the I/O device 140, the processing device 110, the power management device 115, the one or more processing cores 112, the graphics processing unit 114, the I/O device 116, and the memory device 118) may be a separate power domain, combined with any other element(s) in a separate power domain, and/or divided into a plurality of different power domains.

The one or more processing cores 112 may execute applications that demonstrate behavior where the same phases occur over and over again. Because each of the phases may have different resource needs and generate different amounts of activity in the resources on the processing device 110, the best allocation of power among resources or domains on the processing device 110 may be different for each phase. To achieve optimal or improved performance (or maximize other power management objective functions such as efficiency, EDP, ED2P, etc.), the power management device 115 is configured according to certain embodiments to reallocate power between the different power domains differently based on the current phase being processed.

Figure 2A:
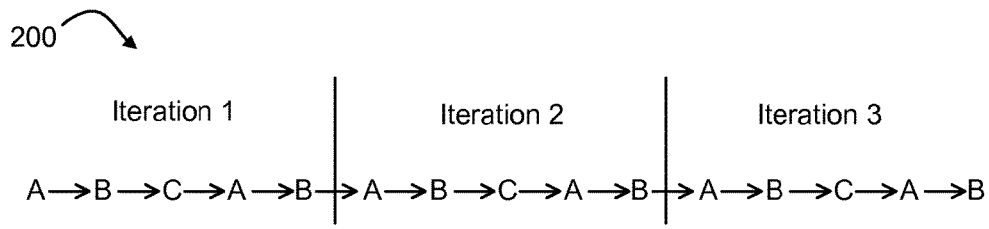
FIGS. 2A, 2B, and 2C illustrate example repeating sequences of phases according to certain embodiments.
Figure 2B:
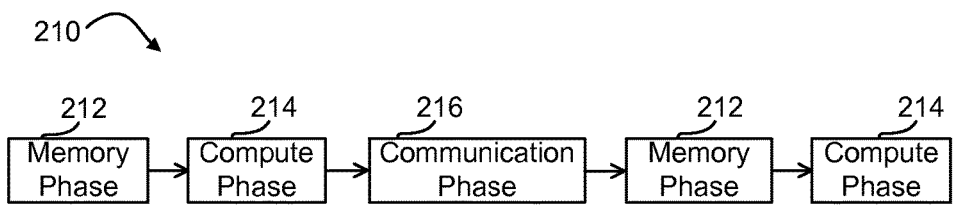
Figure 2C:
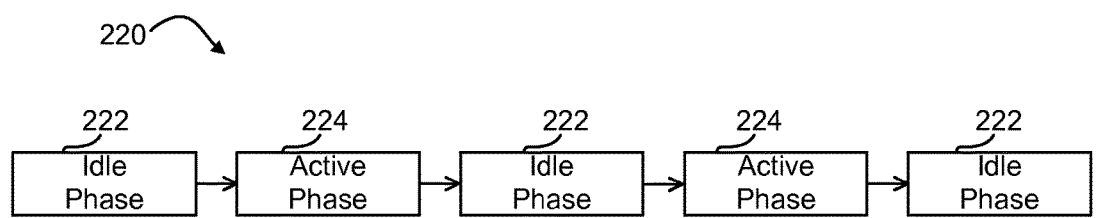

Certain applications may display a behavior where a sequence of phases occurs several times as the application iterates to complete its work. For example, FIGS. 2A, 2B, and 2C illustrate example repeating sequences of phases according to certain embodiments. FIG. 2A shows a sequence 200 of phases including phase "A" followed by phase "B" followed by phase "C" followed by phase "A" followed by phase "B". The sequence repeats in "Iteration 1" followed by "Iteration 2" followed by "Iteration 3". Such repetition lends itself to performance optimization through certain dynamic spatial power steering embodiments. For example, the power management device 115 may be configured to recognize that phase A, phase B, and phase C repeat, and are likely to repeat in many iterations. In response, the power management device 115 determines, over one or more iterations, an optimal or improved power distribution among the power domains for phase A, phase B, and phase C. The power management device 115 applies the optimal or improved power distribution in subsequent iterations and may, in certain embodiments, continue optimizing or improving the power distribution for phase A, phase B, and/or phase C in each subsequent iteration.

Applications may have phases with distinct operational behavior and resource activity patterns which can be observed and leveraged to allocate power more efficiently. For example, FIG. 2B shows a sequence 210 of phases including a memory phase 212 followed by a compute phase 214 followed by a communication phase 216 followed by the memory phase 212, followed by the compute phase 214. The memory phase 212 exhibits high activity in computer memory resources and lower activity in compute and communication resources. Similarly, the compute phase 214 and communication phase 216 exhibit biased compute and communication activity, respectively. As with the example shown in FIG. 2A, the sequence 210 may repeat in many iterations. In other embodiments, the memory phase 212, compute phase 214, communication phase 216, mixed memory/compute/communication phases, and/or other phases do not always occur in the same sequence, or in a predictable sequence. In such embodiments, the power management device 115 still recognizes the occurrence of each phase and applies its corresponding optimal or improved power distribution.

The power management device 115 is configured to spatially redistribute power within the processing device 110 and/or the computer system 105 based on the current phase in the sequence 210. In the memory phase 212, for example, the power management device 115 may determine that power domains associated with the compute phase 214 (e.g., the one or more processing cores 112) require less power. Accordingly, the power management device 115 may reduce the power allocated to the one or more processing cores 112 during the memory phase 212 (e.g., to save energy) and/or redistribute at least a portion of the power to other power domains (e.g., to increase performance of resources involved in the memory phase 212).

FIG. 2C shows a sequence 220 that alternates between an idle phase 222 and an active phase 224. The power management device 115 may be configured, for example, to control the duty cycle of processing comprising (forced or unforced) idle periods and active periods. In some embodiments, during an idle period, the processing device 110 may be placed into an idle state and does not actively process hardware and software operations. The processing device 110 may be placed into the idle state across part or all of the device, including the components such as the one or more processing cores 112, the graphics processing unit 114, the I/O device 116, the memory device 118, and any other uncore components. In another embodiment, the processing device 110 may process only the operations essential for keeping the computer system 105 functioning correctly. In other embodiments, the processing device 110 may process some, but not all software and hardware operations based upon the throttling threshold. The power management device 115 is configured to determine an optimal or improved power distribution among the power domains during the idle phase 222 and the active phase for a particular application, and redistribute the power accordingly during execution.

Figure 3:
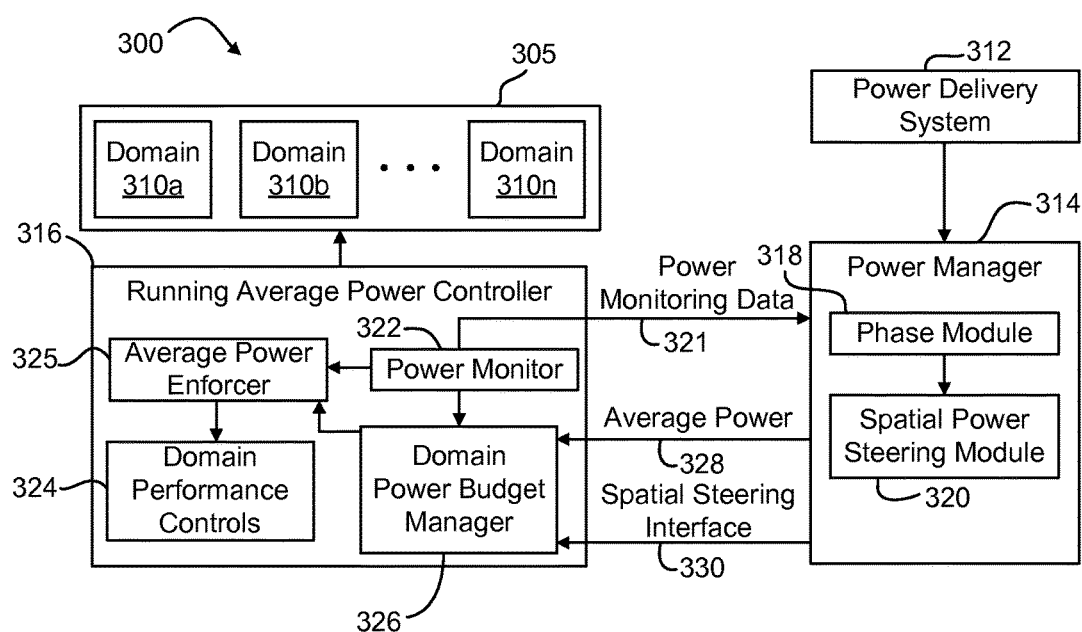
FIG. 3 is a block diagram of an apparatus according to certain embodiments.

FIG. 3 is a block diagram of an apparatus 300 including a node 305 comprising a plurality of power domains (shown as domains 310a, 310b, . . . , 310n), a power delivery system 312, a power manager 314 and a running average power controller 316. The node 305 may comprise, for example, a computing system such as the computer system 105 shown in FIG. 1. In such an embodiment, each domain 310a, 310b, . . . , 310n may include a separate processing device 110. In other examples, the node 305 may be a server or a computing system component such as a microprocessor, an individual core of a multi-core microprocessor, a memory controller hub (MCH), an input/output controller hub (IOH), a memory device, a network interface, or any other type device having one or more power domains that are capable of being monitored and controlled for power consumption. The illustrated power delivery system 312 may include a switching or linear voltage regulator (VR, not shown) capable of supplying a range of voltages to the node 305.

The illustrated power manager 314, which includes a phase module 318 and a spatial power steering module 320, may be a third party element or included in the power delivery system 312, and may be implemented in fixed functionality hardware, microcode, firmware, software, or any combination thereof. In other embodiments, the power manager 314 may be included in or executed by the node 305. For example, the node 305 may include one or more processing cores configured to implement the power manager 305. The phase module 318 is configured to detect phases of an application or process executed by the node 305. Certain embodiments include, for example, a software application program interface (API) that allows a user such as a runtime developer, library developer, or application programmer to annotate and recompile software code so that the code communicates phase information to the power manager 314. The phase module 318 uses the phase information compiled with the code to determine during runtime that a phase is being entered or exited. The API may be lightweight to minimize overhead introduced into the code. The API may insert, for example, one or more API calls into the code for each phase.

In certain embodiments of the API, a shared library may be used to allow an operating system (e.g., Linux) to insert an instrumentation layer between the application and the shared library. While a user may need to write the instrumentation layer, such an embodiment does not require modification to or a recompile of the application or shared libraries. Further, since the libraries have a standard API used by the application, one instrumentation layer may support any shared library implementing the API. Further, if a re-link is possible, then this example embodiment may use statically linked libraries as well.

In addition, or in other embodiments, the phase module 318 is configured to support a mode that infers the phase automatically. Such embodiments do not instrument the application. Rather, the apparatus 300 measures application activity via hardware performance monitoring capabilities. For example, the apparatus 300 samples and analyzes traces of hardware performance counters. At runtime, the phase module 318 applies time series signal processing analysis to the traces to break the trace of application execution into segments of steady behavior. Then, the phase module 318 applies clustering techniques to recognize recurring segments as application phases. For example, the phase module 318 may use ARIMAX autoregression with recursive least squares to learn and predict what the traces of performance counters will be in a next time step. When the prediction is wrong, the phase module 318 determines that the application might be changing phases. The phase module 318 may apply a stabilization loop to filter spurious mispredictions. If, however, the misprediction is not spurious, the phase module 318 identifies a point in time in which the phase changed.

In certain embodiments, the phase module 318 includes a state machine to determine if the application is entering a phase or leaving a phase. For each phase, the phase module 318 keeps track of an application activity signature. The signature is a vector of characteristics including, for example, intensity of computation, communication, or memory derived from the performance counter activity being monitored. To determine a currently executed phase, the phase module 318 uses the activity signature and applies a spatial clustering technique. The phase module 318 partitions the space of possible signatures into equally sized regions and gives each region a corresponding phase number. There may be, by way of example only and not by limitation, a hundred or more different regions/phases. When the application enters a phase, the phase module 318 looks up which region of the space the phase's signature falls within, and labels that phase with a number or identifier designated for the region. The spatial power steering module 320 receives the phase number or identifier and determines an optimal or improved power allocation for each phase.

The spatial power steering module 320 is configured to dynamically "tune" the power limits of the various power domains on the node 305 to maximize some objective function (efficiency, performance, etc.), while adhering to global system constraints such as global power limits. The spatial power steering module 320 uses power monitoring data 321 from the running average power controller 316 for each of the domains 310a, 310b, . . . , 310n to determine the optimal or improved distribution of power in the node 305 for each phase. Domains cannot always use the full power they are allocated. Thus, the spatial power steering module 320 uses the power monitoring data 321 to determine which domains are not using their full allocation of power and reallocates the excess power to other domains. In other embodiments, the spatial power steering module 320 may infer which domains are not using their full allocation of power based on detecting lower performance (i.e., without using the power monitoring data 321). The spatial power steering module 320 may learn or determine the optimal or improved power allocation by, for example, using an iterative process that implements possible permutations of power allocations for the various power domains and measures resulting changes in performance. In addition, or in other embodiments, the spatial power steering module 320 may use advanced search algorithms that access a history based on prior applications runs (for the same application or similar ones) to determine the optimal or improved power allocation for each phase of the application.

As discussed above, certain applications (e.g., HPC applications) demonstrate repetitive behavior where the same phases occur over and over again. The spatial power steering module 320 exploits this operational behavior. Once the "optimal" power allocation has been determined for a particular phase, the spatial power steering module 320 may re-use and/or improve upon the optimal power allocation when the application enters that same phase in the future. Referring again to FIG. 2A, for example, if the spatial power steering module 320 uses two instances of a phase to determine an optimal or improved power allocation scheme for that phase, then by the end of Iteration 1, the spatial power steering module 320 is able to determine or learn the optimal or improved scheme for phases A and B. For the subsequent occurrences of phases A and B, the spatial power steering module 320 may re-use their respective optimal or improved power allocations for the remainder of the application runtime.

In addition, or in other embodiments, the spatial power steering module 320 adapts to changing system configurations, power cap changes, runtime events, and other behavior changes. For example, it may happen that the application behavior changes (e.g., a new application starts running), a system administrator may change the desired objective function of the power manager 314 (e.g., switching from energy efficiency to maximum performance), and/or a fundamental system constraint may change (e.g., the power cap or total power available). The spatial power steering module 320 is configured to automatically adjust to the changes in runtime operational behavior by again determining or relearning the optimal or improved power allocation for each phase as the node 305 executes the application. The spatial power steering module 320 may perform a relearning procedure when, for example, directed by user input, periodically every pre-determined time interval, and/or in a mode where the relearning procedure is launched automatically in response to detecting changes in the system.

The running average power controller 316 includes a power monitor module 322, a domain performance controls module 324, an average power enforcer module 325, and a domain power budget manager module 326. Although the running average power controller 316 is shown as a separate device or module, the running average power controller 316 may be part of or executed by the power manager 314 or the node 305. The running average power controller 316 is configured to monitor and control the power in the various power domains 310a, 310b, . . . , 310n of the node 305 based on an average power signal 328 (e.g., indicating an overall average power for the node 305) and a spatial steering interface 330 received from the power manager 314. Depending on the implementation, the spatial steering interface 330 may comprise, for each phase, a power limit for each domain or group of domains, a null value indicating that it is up to the domain power budget manager module 326 to determine power distribution autonomously through internal heuristics, and/or an indication of relative importance or influence of each domain (e.g., leaving it to the domain power budget manager module 326 to determine power distribution based on the relative importance or influence).

The power monitor module 322 is configured to measure the power consumption of the various power domains 310a, 310b, . . . , 310n and to provide corresponding power monitoring data 321 to the phase module 318 and/or the spatial power steering module 320, as discussed above. The power monitor module 322 also provides the power monitoring data to the average power enforcer 325 and the domain power budget manager 326.

The domain performance controls module 324 includes controls to adjust the performance and power of each domain through, for example, adjusting frequency, throttling bandwidth, and/or adjusting other performance parameters. In certain embodiments, performance levels may be defined and selected in a number of different ways. One approach is to select a performance state, or Px state where a device in the P0 state uses maximum performance capability and may consume maximum power, a device in the P1 state has a performance capability that is limited below its maximum and consumes less than maximum power, and so on. The average power enforcer module 325 configures the domain performance controls module 324 and adapts the configuration over time to maintain an overall average power indicated by the average power signal 328 for the node 305 over a programmable time window. The average power enforcer module 325 comprises a control system that may be implemented with standard controller techniques. The domain power budget manager module 326 comprises logic that outputs power budgets to the average power enforcer module 325. The domain power budget manager module 326 may provide several different interfaces to the spatial power steering module 320 that enable it to either directly specify specific power budgets for each domain (e.g., in units proportional to Watts) or to specify budgets indirectly by specifying hints about relative importance or influence of each domain (in abstract units) and letting the domain power budget manager module 326 apply internal heuristics to the hints and map them to specific budgets for the domains.

Figure 4:
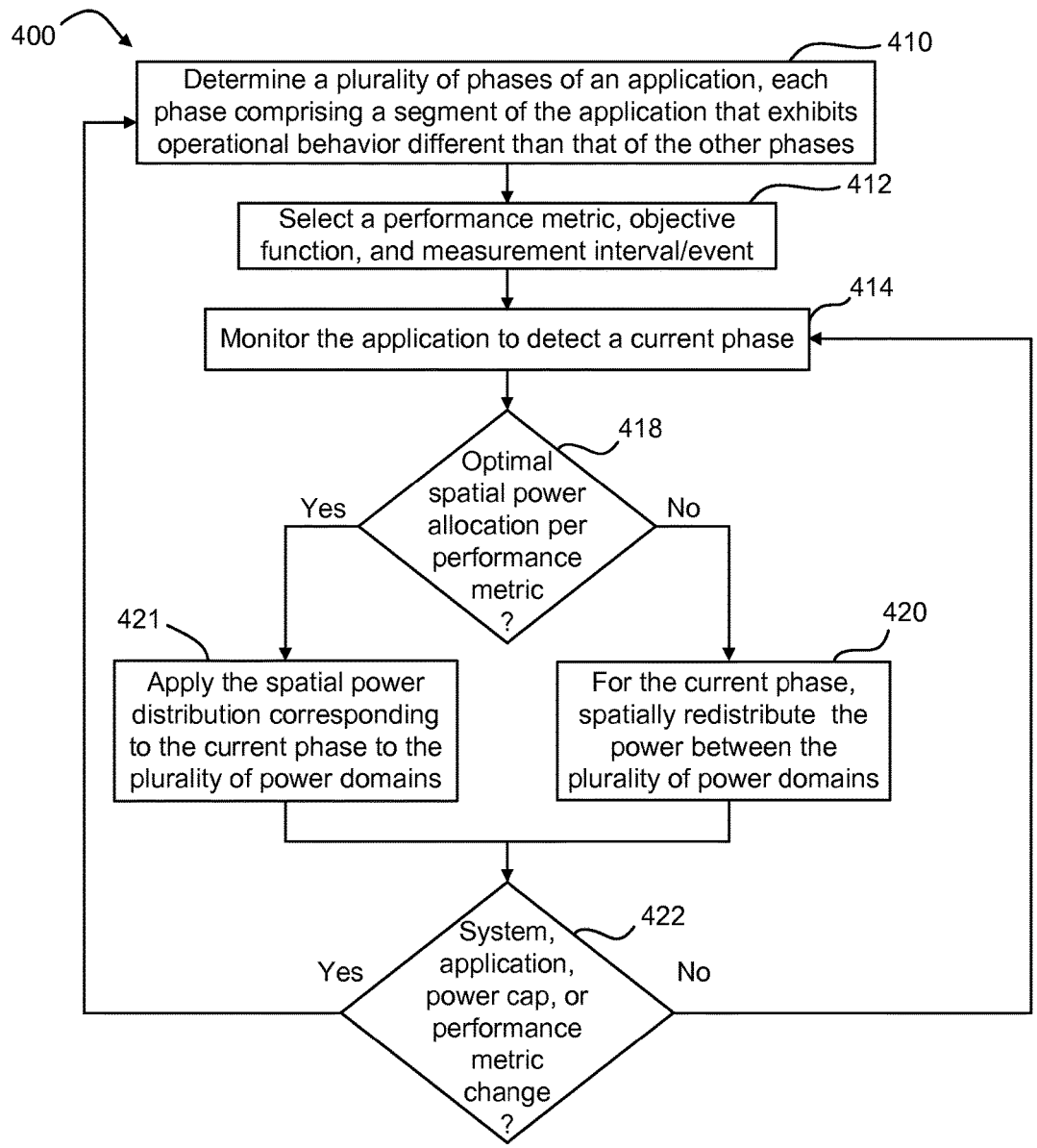
FIG. 4 is a flow chart of a method for dynamic spatial power steering according to one embodiment.

FIG. 4 is a flow chart of a method 400 for dynamic spatial power steering according to one embodiment. The method 400 includes determining 410 a plurality of phases of an application, wherein each of the plurality of phases comprises a segment of the application that exhibits operational behavior different than that of the other phases. The method 400 also includes selecting 412 a performance metric, objective function, and measurement interval and/or event (e.g., a phase change or an end of an iteration). A variety of different definitions of performance may be used, and performance may be measured at a variety of different granularities. Thus, performance can be defined through a metric such as rate of instructions retired, floating-point operations per second (FLOPS), rate of progress, or runtime. Such rates, runtimes, or other performance metrics can be computed at various granularities. For example, the selected performance metric may be measured at short time intervals within each phase, measured upon an event such as the end of each phase, measured at time intervals longer than the phase, measured upon an event such as the end of an iteration (for iterative applications), etc. The method 400 further includes monitoring 414 the application to detect a current phase.

In certain embodiments, the method 400 further includes querying 418 whether an optimal spatial power allocation has been achieved for the current phase per the selected performance metric. In other words, the method 400 may run one or more iterations with a sub-optimal spatial allocation and measure performance during each phase to search for an improved or optimal allocation. Several methods may be used to determine whether the optimal spatial power allocation has been achieved. For example, the method 400 may try many or all permutations (i.e., possible power allocations) and compare the resulting measured performances to determine the optimal distribution. As another example, the method 400 may approximate optimality by using a gradient search method (i.e., estimate gradient of performance metric with respect to the power allocation variables and step in the gradient direction, only trying permutations along the gradient path). In yet another example, if the space of permutations is large, instead of searching the space of permutations exhaustively, the method 400 may apply various sampling methods and take the best allocation among those allocations tried.

If the measurements determine that the optimal power allocation has not been reached (or can be further improved), then the method 400 includes, for the current phase, spatially redistributing 420 the power between the plurality of power domains. If, however, the measurements determine that the optimal power allocation has been reached, the method 400 includes applying 421 the spatial power distribution corresponding to the current phase to the plurality of power domains. The method 400 also includes querying 422 whether there is a system change, application change, power cap change, or selected performance metric change. If not, the method 400 continues monitoring 414 the application to detect a current (or next) phase so as to apply a different spatial power distribution for each phase of the application. If, on the other hand, there is a determined system change, application change, power cap change, or selected performance metric change, the method 400 repeats by again determining 410 a plurality of phases, and/or selecting 412 a performance metric, objective function, and measurement interval/event, before monitoring 414 the application to detect a current phase and again querying 418 whether an optimal spatial power allocation has been achieved.

Figure 5:
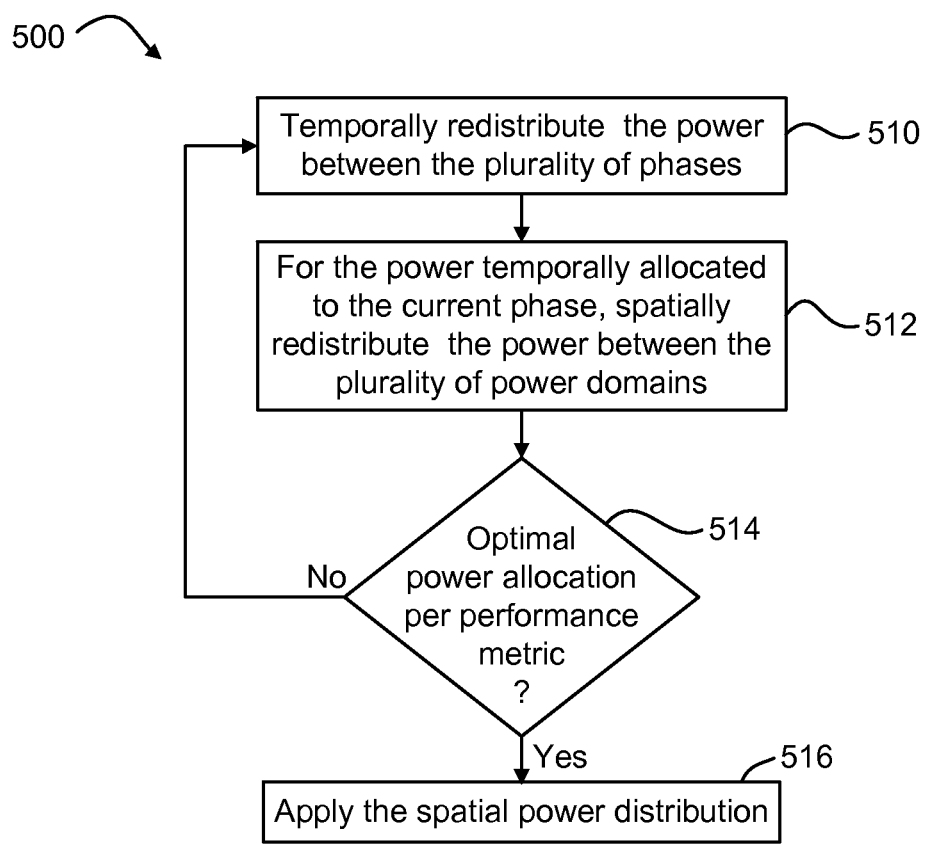
FIG. 5 is a flow chart of a method for both temporal power distribution and spatial power steering according to one embodiment.

In certain embodiments, spatial power steering may be nested within one or more other power management processes. For example, FIG. 5 is a flow chart of a method 500 for both temporal power distribution and spatial power steering according to one embodiment. The method 500 may include, for example, any of the processes shown in FIG. 4. The method 500 also includes temporally redistributing 510 power between the plurality of phases. By identifying opportunities for more efficient power usage across phase boundaries in the temporal dimension, performance of the application may be optimized or improved. For example, temporal power redistribution may include identifying that reducing a computer system's power limit during a memory bound phase, while potentially reducing the memory bound phase's performance, and giving that power to a compute bound phase (i.e., proportionally increasing the computer system's power limit during the compute bound phase) may improve the overall application performance. Thus, this example determines or learns the behavior of the application as a whole and identifies opportunities to improve performance by transferring power (i.e., decreasing or increasing the computer system's power limit) from one phase to another.

The method 500 further includes, for the power temporally allocated to the current phase, spatially redistributing 512 the power between the plurality of power domains, and querying 514 whether an optimal power allocation has been achieved for the current phase per the selected performance metric. If the optimal power allocation has been achieved, then the method 500 includes applying 516 the spatial power distribution, which is based on the power temporally allocated to the current phase. If, however, the optimal power allocation has not been achieved, the method 500 repeats.

EXAMPLE EMBODIMENTS

The following are examples of further embodiments. Examples may include subject matter such as a method, means for perming acts of the method, at least one machine-readable medium including instructions that, when performed by a machine cause the machine to perform acts of the method, or of an apparatus or system for rendering augmented video according to the embodiments and examples described herein.

Example 1 is an apparatus including a power manager comprising logic, at least a portion of which includes hardware. The power manager includes a phase module to determine a plurality of phases of an application. Each of the plurality of phases comprises a segment of the application that exhibits operational behavior different than that of the other phases. The apparatus further includes a spatial power steering module to, for each of the plurality of phases, determine a spatial power distribution between a plurality of power domains based on a performance metric.

Example 2 includes the subject matter of Example 1, wherein the phase module is further configured to detect, in a computer execution of the application, a first phase of the plurality of phases, and wherein the spatial power steering module is further configured to, based on the detection of the first phase, selectively apply a first spatial power distribution to the plurality of power domains.

Example 3 includes the subject matter of Example 2, wherein the phase module is further configured to detect a change in the computer execution of the application from the first phase to a second phase of the plurality of phases, and wherein the spatial power steering module is further configured to, based on the change, selectively apply a second spatial power distribution to the plurality of power domains.

Example 4 includes the subject matter of any of Examples 1-3, wherein one or more of the plurality of phases is selected from a group comprising a compute bound phase, a memory bound phase, a communication bound phase, an idle phase, an active phase, and a combination of any of the foregoing phases.

Example 5 includes the subject matter of any of Examples 1-4, wherein the plurality of phases comprise a repeating sequence, and wherein the spatial power steering module is further configured to, for each of the plurality of phases, determine the spatial power distribution based on a first iteration of the sequence and apply the spatial power distribution in a second iteration of the sequence.

Example 6 includes the subject matter of any of Examples 1-5, wherein the power manager is configured to specify an overall power budget for the plurality of domains, and wherein the spatial power steering module is further configured to determine the spatial power distribution of each of the plurality of phases based at least in part on the overall power budget.

Example 7 includes the subject matter of any of Examples 1-6, wherein the spatial power steering module is configured to specify the spatial power distribution as a power limit for each of a plurality of power domains during a particular phase.

Example 8 includes the subject matter of any of Examples 1-6, further comprising a running average power controller to monitor and control the power of each of the plurality of power domains based on the determined spatial power distribution determined by the spatial power steering module for each of the plurality of phases.

Example 9 includes the subject matter of Example 8, wherein the spatial power steering module is configured to specify the spatial power distribution as an indication of relative influence of each of the plurality of power domains, and wherein the running average power controller comprises a domain power budget manager configured to decide specific power budgets for each of the plurality of power domains based on the indication of relative influence.

Example 10 includes the subject matter of any of Examples 1-9, The further comprising one or more nodes comprising the plurality of power domains, wherein at least one of the power domains of the plurality of power domains comprises a core domain comprising one or more processing cores, and wherein at least one of the power domains of the plurality of domains comprises an uncore domain comprising one or more uncore components.

Example 11 is a method including determining a plurality of phases corresponding to an application comprising tasks for execution on a processing node. The method also includes selecting a performance metric, an objective function, and at least one of a measurement interval and a measurement event for evaluating the performance metric. The method further includes monitoring the application to detect a current phase, and determining, based on measurements made according to the measurement interval, whether a spatial power distribution between a plurality of power domains on the processing node for the current phase satisfies the selected objective function. If the spatial power distribution does not satisfy the selected objective function for the current phase, the method includes spatially redistributing the power between the plurality of power domains, If, however, the spatial power distribution satisfies the selected objective function for the current phase, the method includes applying the spatial power distribution corresponding to the current phase to the plurality of power domains.

Example 12 includes the subject matter of Example 11, and further includes: detecting change in at least one of the application, the node, a power cap, and a system comprising the node; and in response to the detected change, reconfiguring the spatial power distribution between a plurality of power domains.

Example 13 includes the subject matter of any of Examples 11-12, and further includes determining the plurality of phases comprises detecting at least two of a compute bound phase, a memory bound phase, a communication bound phase, an idle phase, and an active phase.

Example 14 includes the subject matter of any of Examples 11-13, and further includes: detecting a repeating sequence comprising the plurality of phases; for each of the plurality of phases, determining the spatial power distribution based on a first iteration of the sequence; and for each of the plurality of phases, applying the spatial power distribution in a second iteration of the sequence.

Example 15 includes the subject matter of any of Examples 11-14, and further includes determining the spatial power distribution of each of the plurality of phases based at least in part on an overall power budget for the plurality of power domains.

Example 16 is an apparatus comprising means to perform a method as in any of Examples 11-15.

Example 17 is at least one computer-readable storage medium having stored thereon instructions that, when executed by a processor, cause the processor to perform operations comprising: determining a plurality of phases corresponding to an application comprising tasks for execution on a processing node; for each of the plurality of phases, determining a spatial power distribution between a plurality of power domains on the processing node based on a performance metric; monitoring the application to detect a current phase; and applying the spatial power distribution correspond to the current phase to the plurality of power domains.

Example 18 includes the subject matter of Example 17, wherein the operations further comprise: detecting change in at least one of the application, the node, and a system comprising the node; and in response to the detected change, reconfiguring the spatial power distribution between a plurality of power domains.

Example 19 includes the subject matter of any of Examples 17-18, wherein determining the plurality of phases comprises detecting at least two of a compute bound phase, a memory bound phase, a communication bound phase, an idle phase, and an active phase.

Example 20 includes the subject matter of any of Examples 17-19, wherein the operations further comprise: detecting a repeating sequence comprising the plurality of phases; for each of the plurality of phases, determining the spatial power distribution based on a first iteration of the sequence; and for each of the plurality of phases, applying the spatial power distribution in a second iteration of the sequence.

Example 21 includes the subject matter of any of Examples 17-21, wherein the operations further comprise: determining the spatial power distribution of each of the plurality of phases based at least in part on a running average power limit specified for at least one of the plurality of power domains, the node, and a system comprising the node.

Example 22 is a system including at least one core domain, at least one uncore domain, and a power manager. The power manager is configured to: determine a plurality of phases corresponding to an application; for each of the plurality of phases, determine a spatial power distribution between the at least one core domain and the at least one uncore domain; monitor the application to detect a current phase; and apply the spatial power distribution correspond to the current phase to the at least one core domain and the at least one uncore domain.

Example 23 includes the subject matter of Example 22, wherein the power manager is further configured to: detect a change in at least one of the application and the system; and in response to the detected change, reconfigure the spatial power distribution between the at least one core domain and the at least one uncore domain.

Example 24 is a method comprising: determining a plurality of phases corresponding to an application; for each of the plurality of phases, determining a spatial power distribution between at least one core domain and at least one uncore domain; monitoring the application to detect a current phase; and applying the spatial power distribution correspond to the current phase to the at least one core domain and the at least one uncore domain.

Example 25 includes the subject matter of Example 24, and further includes: detecting a change in at least one of the application and a system executing the application; and in response to detecting the change, reconfiguring the spatial power distribution between the at least one core domain and the at least one uncore domain.

Example 26 is an apparatus comprising means to perform a method as claimed in any of claims 24-25.

Example 27 is a machine readable storage including machine-readable instructions to implement a method or realize an apparatus as claimed in any of claims 24-25.

The above description provides numerous specific details for a thorough understanding of the embodiments described herein. However, those of skill in the art will recognize that one or more of the specific details may be omitted, or other methods, components, or materials may be used. In some cases, well-known features, structures, or operations are not shown or described in detail.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. An apparatus comprising:
   a memory to store data corresponding to a spatial power distribution;
   a power manager comprising logic, at least a portion of which includes hardware, the power manager to:
      determine a plurality of phases of an application, wherein each of the plurality of phases comprises a segment of the application that exhibits operational behavior different than that of the other phases, and wherein each segment of the application exhibits predictable operational behavior,
      recognize a repeating sequence of phases comprising at least a first iteration of the sequence and a second iteration of the sequence, and
      for each of the plurality of phases, determine a spatial power distribution between a plurality of power domains based on a performance metric, wherein for phases in the second iteration of the sequence, the spatial power distribution is based on a corresponding phase in the first iteration of the sequence; and
   circuitry to distribute power to the plurality of power domains according to the spatial power distribution,
   wherein one or more of the plurality of phases is selected from a group comprising a compute bound phase, a memory bound phase, a communication bound phase, an idle phase, an active phase, and a combination of any of the foregoing phases.

2. The apparatus of claim 1, wherein the logic of the power manager is further configured to detect, in a computer execution of the application, a first phase of the plurality of phases, and wherein the circuitry to distribute power is further configured to, based on the detection of the first phase, selectively apply a first spatial power distribution to the plurality of power domains.

3. The apparatus of claim 2, wherein the logic of the power manager is further configured to detect a change in the computer execution of the application from the first phase to a second phase of the plurality of phases, and wherein the circuitry to distribute power is further configured to, based on the change, selectively apply a second spatial power distribution to the plurality of power domains.

4. The apparatus of claim 1, wherein the power manager is configured to specify an overall power budget for the plurality of domains, and to determine the spatial power distribution of each of the plurality of phases based at least in part on the overall power budget.

5. The apparatus of claim 4, wherein the power manager is configured to specify the spatial power distribution as a power limit for each of a plurality of power domains during a particular phase.

6. The apparatus of claim 4, further comprising a running average power controller to monitor and control the power of each of the plurality of power domains based on the determined spatial power distribution determined by the power manager for each of the plurality of phases.

7. The apparatus of claim 6, wherein the power manager is configured to specify the spatial power distribution as an indication of relative influence of each of the plurality of power domains, and wherein the running average power controller comprises a domain power budget manager configured to decide specific power budgets for each of the plurality of power domains based on the indication of relative influence.

8. The apparatus of claim 1, further comprising one or more nodes comprising the plurality of power domains, wherein at least one of the power domains of the plurality of power domains comprises a core domain comprising one or more processing cores, and wherein at least one of the power domains of the plurality of domains comprises an uncore domain comprising one or more uncore components.

9. A method comprising:
    determining a plurality of phases corresponding to an application comprising tasks for execution on a processing node by:
        monitoring hardware performance;
        detecting segments of the application that exhibit predictable operational behavior; and
        generating an application activity signature for each phase;
    selecting a performance metric, an objective function, and at least one of a measurement interval and a measurement event for evaluating the performance metric;
    monitoring the application to detect a current phase;
    determining, based on measurements made according to the measurement interval, whether a spatial power distribution between a plurality of power domains on the processing node for the current phase satisfies the selected objective function;
    if the spatial power distribution does not satisfy the selected objective function for the current phase, spatially redistributing the power between the plurality of power domains;
    if the spatial power distribution satisfies the selected objective function for the current phase, applying the spatial power distribution corresponding to the current phase to the plurality of power domains;

detecting change in at least one of the application, the node, a power cap, and a system comprising the node; and
in response to the detected change, reconfiguring the spatial power distribution between a plurality of power domains.

10. The method of claim 9, wherein determining the plurality of phases comprises detecting at least two of a compute bound phase, a memory bound phase, a communication bound phase, an idle phase, and an active phase.

11. The method of claim 9, further comprising:
    detecting a repeating sequence comprising the plurality of phases;
    for each of the plurality of phases, determining the spatial power distribution based on a first iteration of the sequence; and
    for each of the plurality of phases, applying the spatial power distribution in a second iteration of the sequence.

12. The method of claim 9, further comprising:
    determining the spatial power distribution of each of the plurality of phases based at least in part on an overall power budget for the plurality of power domains.

13. The method of claim 9, wherein determining a plurality of phases further comprises:
    analyzing traces of hardware performance counters;
    applying time series signal processing analysis to the traces to break the trace of application execution into segments of steady behavior; and
    applying clustering techniques to recognize recurring segments as application phases.

14. The method of claim 9, wherein the application activity signature comprises a vector of characteristics including intensity of computation, communication, and memory derived from the hardware performance counter activity being monitored.

15. At least one non-transitory computer-readable storage medium having stored thereon instructions that, when executed by a processor, cause the processor to perform operations comprising:
    determining a plurality of phases corresponding to an application comprising tasks for execution on a processing node by:
        monitoring hardware performance;
        detecting segments of the application that exhibit predictable operational behavior; and
        generating an application activity signature for each phase;
    for each of the plurality of phases, determining a spatial power distribution between a plurality of power domains on the processing node based on a performance metric;
    monitoring the application to detect a current phase;
    applying the spatial power distribution correspond to the current phase to the plurality of power domains;
    detecting change in at least one of the application, the node, and a system comprising the node; and
    in response to the detected change, reconfiguring the spatial power distribution between a plurality of power domains.

16. The at least one non-transitory computer-readable storage medium of claim 15, wherein determining the plurality of phases comprises detecting at least two of a compute bound phase, a memory bound phase, a communication bound phase, an idle phase, and an active phase.

17. The at least one non-transitory computer-readable storage medium of claim 15, wherein the operations further comprise:
  detecting a repeating sequence comprising the plurality of phases;
  for each of the plurality of phases, determining the spatial power distribution based on a first iteration of the sequence; and
  for each of the plurality of phases, applying the spatial power distribution in a second iteration of the sequence.

18. The at least one non-transitory computer-readable storage medium of claim 15, wherein the operations further comprise:
  determining the spatial power distribution of each of the plurality of phases based at least in part on a running average power limit specified for at least one of the plurality of power domains, the node, and a system comprising the node.

19. A system comprising:
  at least one core domain;
  at least one uncore domain; and
  a power manager configured to:
    determine a plurality of phases corresponding to an application by:
      monitoring hardware performance;
      detecting segments of the application that exhibit predictable operational behavior; and
      generating an application activity signature for each phase;
    for each of the plurality of phases, determine a spatial power distribution between the at least one core domain and the at least one uncore domain;
    monitor the application to detect a current phase;
    apply the spatial power distribution correspond to the current phase to the at least one core domain and the at least one uncore domain;
    detect a change in at least one of the application and the system; and
    in response to the detected change, reconfigure the spatial power distribution between the at least one core domain and the at least one uncore domain.

20. At least one non-transitory computer-readable storage medium having stored thereon instructions that, when executed by a processor, cause the processor to perform operations comprising:
  determining a plurality of phases corresponding to an application comprising tasks for execution on a processing node by:
    monitoring hardware performance;
    detecting segments of the application that exhibit predictable operational behavior; and
    generating an application activity signature for each phase;
  for each of the plurality of phases, determining a spatial power distribution between a plurality of power domains on the processing node based on a performance metric;
  monitoring the application to detect a current phase; and
  applying the spatial power distribution correspond to the current phase to the plurality of power domains,
  wherein determining the plurality of phases comprises detecting at least two of a compute bound phase, a memory bound phase, a communication bound phase, an idle phase, and an active phase.

21. The at least one non-transitory computer-readable storage medium of claim 20, wherein the operations further comprise:
  detecting change in at least one of the application, the node, and a system comprising the node; and
  in response to the detected change, reconfiguring the spatial power distribution between a plurality of power domains.

22. The at least one non-transitory computer-readable storage medium of claim 20, wherein the operations further comprise:
  detecting a repeating sequence comprising the plurality of phases;
  for each of the plurality of phases, determining the spatial power distribution based on a first iteration of the sequence; and
  for each of the plurality of phases, applying the spatial power distribution in a second iteration of the sequence.

23. The at least one non-transitory computer-readable storage medium of claim 20, wherein the operations further comprise:
  determining the spatial power distribution of each of the plurality of phases based at least in part on a running average power limit specified for at least one of the plurality of power domains, the node, and a system comprising the node.

24. A method comprising:
  determining a plurality of phases corresponding to an application comprising tasks for execution on a processing node by:
    monitoring hardware performance;
    detecting segments of the application that exhibit predictable operational behavior; and
    generating an application activity signature for each phase;
    analyzing traces of hardware performance counters;
    applying time series signal processing analysis to the traces to break the trace of application execution into segments of steady behavior; and
    applying clustering techniques to recognize recurring segments as application phases;
  selecting a performance metric, an objective function, and at least one of a measurement interval and a measurement event for evaluating the performance metric;
  monitoring the application to detect a current phase;
  determining, based on measurements made according to the measurement interval, whether a spatial power distribution between a plurality of power domains on the processing node for the current phase satisfies the selected objective function;
  if the spatial power distribution does not satisfy the selected objective function for the current phase, spatially redistributing the power between the plurality of power domains; and
  if the spatial power distribution satisfies the selected objective function for the current phase, applying the spatial power distribution corresponding to the current phase to the plurality of power domains.

25. A method comprising:
  determining a plurality of phases corresponding to an application comprising tasks for execution on a processing node by:
    monitoring hardware performance;
    detecting segments of the application that exhibit predictable operational behavior; and generating an application activity signature for each phase, wherein the application activity signature comprises a vector of characteristics including intensity of computation, communication, and memory derived from the hardware performance counter activity being monitored;

selecting a performance metric, an objective function, and at least one of a measurement interval and a measurement event for evaluating the performance metric;

monitoring the application to detect a current phase;

determining, based on measurements made according to the measurement interval, whether a spatial power distribution between a plurality of power domains on the processing node for the current phase satisfies the selected objective function;

if the spatial power distribution does not satisfy the selected objective function for the current phase, spatially redistributing the power between the plurality of power domains; and if the spatial power distribution satisfies the selected objective function for the current phase, applying the spatial power distribution corresponding to the current phase to the plurality of power domains.

* * * * *